United States Patent
Luo et al.

(10) Patent No.: US 12,191,677 B2
(45) Date of Patent: Jan. 7, 2025

(54) STRUCTURES FOR IN-BAND COMMUNICATIONS IN WIRELESS CHARGING

(71) Applicant: NuVolta Technologies (Hefei) Co., Ltd., Hefei (CN)

(72) Inventors: Zhijun Luo, Shanghai (CN); Ikgyoo Song, Suwon-si (KR)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 103 days.

(21) Appl. No.: 18/132,784

(22) Filed: Apr. 10, 2023

(65) Prior Publication Data

US 2024/0171010 A1    May 23, 2024

(30) Foreign Application Priority Data

Nov. 18, 2022    (CN) .......................... 202211449401.6

(51) Int. Cl.
*H02J 50/12* (2016.01)
*H02J 50/80* (2016.01)
*H02J 7/00* (2006.01)
*H02J 7/02* (2016.01)

(52) U.S. Cl.
CPC .............. *H02J 50/12* (2016.02); *H02J 50/80* (2016.02); *H02J 7/007* (2013.01); *H02J 7/02* (2013.01)

(58) Field of Classification Search
CPC .............. H02J 50/12; H02J 50/80; H04B 5/79
See application file for complete search history.

(56) References Cited

U.S. PATENT DOCUMENTS

| 2014/0339910 | A1* | 11/2014 | Sealy | ....................... H02J 50/12 307/104 |
| 2015/0115730 | A1* | 4/2015 | Kanno | ................ H02J 7/00036 307/104 |
| 2017/0012470 | A1* | 1/2017 | Nakano | ............... H02J 7/00034 |
| 2017/0201127 | A1* | 7/2017 | Jung | ....................... H02J 50/12 |

(Continued)

FOREIGN PATENT DOCUMENTS

WO    WO-2022041018 A1 *  3/2022

OTHER PUBLICATIONS

English machine translation of WO2022041018A1 published Mar. 3, 2022. (Year: 2022).*

*Primary Examiner* — Rexford N Barnie
*Assistant Examiner* — David A Shiao
(74) *Attorney, Agent, or Firm* — AP3 Law Firm, PLLC

(57) ABSTRACT

An apparatus for wireless power reception includes a receiver coil and a rectifier having a first input and a second input, the first input coupled to a first terminal of a receiver coil, the second input coupled to a second terminal of the receiver coil through a resonant capacitor. The apparatus further includes a first capacitor and a first switch network connected in series between the first input and ground and a second capacitor and a second switch network connected in series between the second input and ground, each of the first switch network and the second switch network including at least a plurality of field-effect transistors (FETs) connected in parallel, wherein the first switch network and the second switch network configured to adjust an impedance coupled to the receiver coil, the impedance associated with an Amplitude Shift Keying (ASK) modulation used by the apparatus.

20 Claims, 9 Drawing Sheets

(56) References Cited

U.S. PATENT DOCUMENTS

| | | | | |
|---|---|---|---|---|
| 2017/0288474 A1* | 10/2017 | Sakata | .................... | H02J 50/80 |
| 2017/0346344 A1* | 11/2017 | Uchimoto | ............... | H02J 50/12 |
| 2020/0044491 A1* | 2/2020 | Qiu | ......................... | H04B 5/72 |
| 2021/0385114 A1* | 12/2021 | Mehas | ................... | H02M 1/32 |
| 2022/0360296 A1* | 11/2022 | Luo | ........................ | H02J 50/12 |
| 2023/0129480 A1* | 4/2023 | Hong | ..................... | H02J 50/80 307/104 |
| 2023/0412001 A1* | 12/2023 | Kim | ....................... | H02J 50/12 |
| 2024/0006918 A1* | 1/2024 | Liu | .................... | H02M 1/0025 |

* cited by examiner

STRUCTURES FOR IN-BAND COMMUNICATIONS IN WIRELESS CHARGING

PRIORITY CLAIM

This application claims priority to Chinese Patent Application No. 202211449401.6, filed on Nov. 18, 2022, which is hereby incorporated by reference in its entirety.

TECHNICAL FIELD

The present invention relates to a wireless power transfer system, and, in particular embodiments, to in-band communications between a transmitter and a receiver of the wireless power transfer system.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is coupled to the secondary side receiver through a magnetic coupling. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

In a wireless power transfer system, various control signals may be generated based upon the operating parameters at the secondary side receiver. The control signals may be transferred from the secondary side receiver to the primary side transmitter. In particular, the control signals may be transmitted from a receiver coil to a transmitter coil in the form of modulated signals using suitable modulation schemes. Transmission and reception of the control signals between the primary side transmitter and the secondary side receiver is called in-band communications in the wireless power transfer system. Amplitude shift keying (ASK) is a widely used modulation scheme in the receiver of the wireless power transfer system. ASK is carried out through modulating the amplitude of the analog signal in the wireless power transfer system. Information is passed through the amplitude variation of the analog signal. An analog sensing device is employed to detect the control signals, which may be included in the current and/or the voltage applied to the transmission coil. A demodulator at the primary side transmitter may be employed to demodulate the signals detected by the analog sensing device and feed the demodulated signals to a transmitter controller so as to better control the operation of the transmitter.

The communication information may be transferred from the receiver to the transmitter and demodulated in the transmitter through varying the operating parameters of the transmitter. One relatively simple method to vary the operating parameters of the transmitter is based on an impedance modulation method. For example, a pair of capacitor-switch networks is coupled to two terminals of the receiver coil, respectively. The switches of the pair of capacitor-switch networks are switched on and off during communication so that the impedance coupled to the receiver coil is changed. The impedance variation has an impact on the electrical characteristics of the transmitter. In response to this impact, some operating parameters (e.g., the current flowing through the transmitter coil and/or the voltage across the transmitter coil) may vary. The control circuit in the transmitter detects the variation of at least one operating parameter and retrieves the communication information through demodulating the variation of this operating parameter.

Conventional capacitor-switch networks may be connected between inputs of a rectifier of the receiver. Capacitors in the capacitor-switch networks and some other capacitors in the receiver may form a resonant circuit with the receiver coil. When the capacitor-switch networks are turned on, an oscillating current between the inputs of the rectifier may be generated due to the LC tank properties of the resonant circuit. This oscillating current may interfere with currents in the rectifier and cause unexpected consequences to the functioning of the rectifier. For example, when the receiver coil has a smaller induction and the receiver is not coupled to any loads or coupled to a light load, that oscillating current may become large enough to change the direction of a current within the rectifier. Such a disturbance may cause a sudden drop of an output voltage of the rectifier and data loss during the in-band communications in the wireless power transfer system. As a result, the rectifier may shut down and even the wireless power transfer may end unintentionally.

Therefore, advanced structures to reduce the interference caused by the in-band communications to the wireless power transfer and to make the power transfer more efficient and more reliable are desired.

SUMMARY

These and other problems are generally solved or circumvented, and technical advantages are generally achieved, by preferred embodiments of the present disclosure which provide a communication apparatus in a receiver of a wireless power transfer system.

In accordance with an embodiment, an apparatus for wireless power reception comprises a rectifier configured to convert an alternating current voltage into a direct current voltage for a load coupled to the apparatus. The apparatus further comprises a receiver coil and a resonant capacitor connected in series, wherein a combination of the receiver coil and the resonant capacitor connected between two inputs of the rectifier. The apparatus further comprises a first capacitor and a first switch connected in series, wherein a combination of the first capacitor and the first switch connected in parallel with the resonant capacitor. The apparatus further comprises a second capacitor and a second switch connected in series, wherein a combination of the second capacitor and the second switch connected in parallel with the resonant capacitor, and wherein the first switch and the second switch are configured to adjust an impedance coupled to the receiver coil, where the impedance is associated with an Amplitude Shift Keying (ASK) modulation used by the apparatus.

In accordance with an embodiment, a method comprises connecting a receiver coil and a resonant capacitor in series. The method further comprises connecting a combination of the receiver coil and the resonant capacitor between two inputs of a rectifier, wherein the rectifier is configured to convert an alternating current voltage into a direct current voltage for a load of a wireless power transfer system. The method further comprises connecting a first capacitor and a first switch in series and connecting a combination of the first capacitor and the first switch in parallel with the resonant capacitor. The method further comprises connecting a second capacitor and a second switch in series and connecting a combination of the second capacitor and the second switch in parallel with the resonant capacitor. The method further comprises configuring the first switch and the second switch to adjust an impedance coupled to the receiver coil, wherein the impedance associated with an ASK modulation used by the wireless power transfer system.

In accordance with an embodiment, a controller circuit of a wireless power reception system comprises a first switch and a second switch, wherein the first switch is connected in series with a first capacitor, wherein the second switch is connected in series with a second capacitor, wherein a combination of the first switch and the first capacitor is connected in parallel with a resonant capacitor, a series combination of the resonant capacitor and a receiver coil of the wireless power reception system connected between two inputs of a rectifier of the wireless power reception system, wherein a combination of the second switch and the second capacitor is connected in parallel with the resonant capacitor, and wherein the first switch and the second switch are configured to adjust an impedance coupled to the receiver coil, the impedance associated with an ASK modulation used by the wireless power reception system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a communication apparatus in a receiver of a wireless power transfer system. The disclosure may also be applied, however, to a variety of power systems. Hereinafter, various embodiments will be explained in detail with reference to the accompanying drawings.

Figure 1:
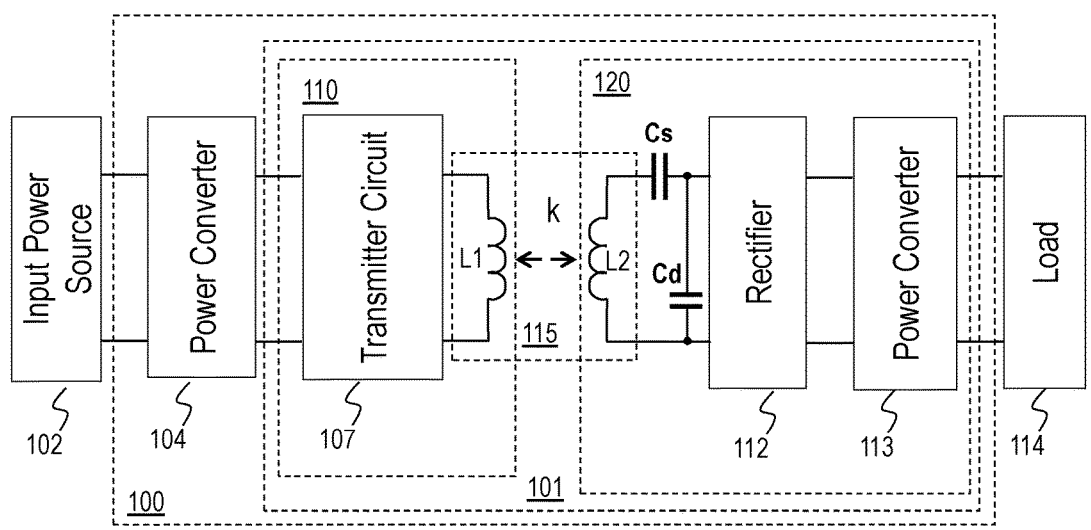
FIG. 1 illustrates a block diagram of a wireless power transfer system in accordance with some embodiments.

FIG. 1 illustrates a block diagram of a wireless power transfer system in accordance with various embodiments of the present disclosure. The wireless power transfer system 100 comprises a power converter 104 and a wireless power transfer device 101 connected in cascade between an input power source 102 and a load 114. In some embodiments, the power converter 104 is employed to further improve the performance of the wireless power transfer system 100. In alternative embodiments, the power converter 104 is an optional element. In other words, the wireless power transfer device 101 may be connected to the input power source 102 directly.

The wireless power transfer device 101 includes a power transmitter 110 and a power receiver 120 (which is also referred to as a receiver in the present disclosure). As shown in FIG. 1, the power transmitter 110 comprises a transmitter circuit 107 and a transmitter coil L1 connected in cascade. The input of the transmitter circuit 107 is coupled to an output of the power converter 104. The power receiver 120 comprises a receiver coil L2, a resonant capacitor Cs, a rectifier 112 and a power converter 113 connected in cascade. As shown in FIG. 1, the resonant capacitor Cs is connected in series with the receiver coil L2 and further connected to the inputs of the rectifier 112. The resonant capacitor Cs may help achieve soft switching for the wireless power transfer system. The outputs of the rectifier 112 are connected to the inputs of the power converter 113. The outputs of the power converter 113 are coupled to the load 114. The power receiver 120 may further comprise another resonant capacitor Cd connected between the inputs of the rectifier 112. Optionally, the resonant capacitor Cd may be connected in series with a switch. The resonant capacitor Cd may be configured to shift the resonance frequency of the resonant circuit formed by the receiver coil L2, the resonant capacitor Cs, and the resonant capacitor Cd, and thus help the power transmitter 110 detect the presence of the power receiver 120.

The power transmitter 110 is magnetically coupled to the power receiver 120 through a magnetic field when the power receiver 120 is placed near the power transmitter 110. A loosely coupled transformer 115 is formed by the transmitter coil L1, which is part of the power transmitter 110, and the receiver coil L2, which is part of the power receiver 120. As a result, electrical power may be transferred from the power transmitter 110 to the power receiver 120.

In some embodiments, the power transmitter 110 may be inside a charging pad. The transmitter coil L1 is placed underneath the top surface of the charging pad. The power receiver 120 may be embedded in a mobile phone. When the mobile phone is placed near the charging pad, a magnetic coupling may be established between the transmitter coil L1 and the receiver coil L2. In other words, the transmitter coil L1 and the receiver coil L2 may form a loosely coupled transformer through which a power transfer occurs between the power transmitter 110 and the power receiver 120. The strength of coupling between the transmitter coil L1 and the receiver coil L2 is quantified by the coupling coefficient k. In some embodiments, k is in a range from about 0.05 to about 0.9.

In some embodiments, after the magnetic coupling has been established between the transmitter coil L1 and the receiver coil L2, the power transmitter 110 and the power receiver 120 may form a power system through which power is wirelessly transferred from the input power source 102 to the load 114.

The input power source 102 may be a power adapter converting a utility line voltage to a direct-current (dc) voltage. Alternatively, the input power source 102 may be a renewable power source such as a solar panel array. Furthermore, the input power source 102 may be any suitable energy storage devices such as rechargeable batteries, fuel cells, any combinations thereof and/or the like.

The load 114 represents the power consumed by the mobile device (e.g., a mobile phone) coupled to the power receiver 120. Alternatively, the load 114 may refer to a rechargeable battery and/or batteries connected in series/parallel, and coupled to the output of the power receiver 120. Furthermore, the load 114 may be a downstream power converter such as a battery charger.

The transmitter circuit 107 may comprise primary side switches of a full-bridge converter according to some embodiments. Alternatively, the transmitter circuit 107 may comprise the primary side switches of any other suitable power converters such as a half-bridge converter, a push-pull converter, any combinations thereof and/or the like.

It should be noted that the power converters described above are merely examples. One having ordinary skill in the art will recognize other suitable power converters such as class E topology based power converters (e.g., a class E amplifier), may alternatively be used depending on design needs and different applications.

The transmitter circuit 107 may further comprise a resonant capacitor (not shown). The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire.

The power receiver 120 comprises the receiver coil L2 magnetically coupled to the transmitter coil L1 after the power receiver 120 is placed near the power transmitter 110. As a result, power may be transferred to the receiver coil and further delivered to the load 114 through the rectifier 112. The power receiver 120 may comprise a secondary resonant capacitor Cs as shown in FIG. 1. Throughout the description, the secondary resonant capacitor Cs may be alternatively referred to as a receiver resonant capacitor. The power receiver 120 may further comprise a circuit configured for in-band communications between the power transmitter 110 and the power receiver 120 (not shown but illustrated in FIG. 2).

The rectifier 112 converts an alternating polarity waveform received from the resonant tank comprising the receiver coil L2 and the receiver resonant capacitor Cs to a single polarity waveform. In some embodiments, the rectifier 112 comprises a full-wave diode bridge and an output capacitor. In alternative embodiments, the full-wave diode bridge may be replaced by a full-wave bridge formed by switching elements such as n-type metal oxide semiconductor (NMOS) transistors.

Furthermore, the rectifier 112 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 112 are well known in the art, and hence are not discussed herein.

The power converter 113 is coupled between the rectifier 112 and the load 114. The power converter 113 may be employed to further adjust the voltage/current applied to the load 114. The power converter 113 is a non-isolated power converter. In some embodiments, the power converter 113 is implemented as a step-down power converter such as a buck converter. In alternative embodiments, the power converter 113 is implemented as a four-switch buck-boost power converter.

Furthermore, the power converter 113 may be implemented as a hybrid power converter. The hybrid converter is a non-isolated power converter. By controlling the on/off of the switches of the hybrid converter, the hybrid converter can be configured as a buck converter, a charge pump converter or a hybrid converter.

Depending design needs and different applications, the hybrid converter may operate in different operating modes. More particularly, the hybrid converter may operate in a buck mode when the load current is less than a predetermined current threshold and/or the input voltage is less than a predetermined voltage threshold. In the buck mode, the hybrid converter is configured as a buck converter. The hybrid converter may operate in a charge pump mode or a hybrid mode when the input voltage is greater than the predetermined voltage threshold and/or the load current is greater than the predetermined current threshold. More particularly, in some embodiments, the hybrid converter may operate in a charge pump mode or a hybrid mode when a ratio of the output voltage of the hybrid converter to the input voltage of the hybrid converter is less than 0.5. In the charge pump mode, the hybrid converter is configured as a charge pump converter. In the hybrid mode, the hybrid converter is configured as a hybrid converter.

In some embodiments, the hybrid converter comprises a first switch, a capacitor and a second switch connected in series between the output of the rectifier 112 and the input of the load 114. The hybrid converter further comprises a third switch and a fourth switch. The third switch is connected between a common node of the first switch and the capacitor, and a common node of the second switch and the output terminal of the hybrid converter. The fourth switch is connected between a common node of the capacitor and the second switch, and ground.

Moreover, the power converter 113 may comprise a first power stage and a second power stage connected in cascade. The first power stage is configured to operate in different modes for efficiently charging the load 114 (e.g., a rechargeable battery). In some embodiments, the first stage may be implemented as a step-down power converter (e.g., a buck converter), a four-switch buck-boost converter, a hybrid converter and any combinations thereof. The second power stage is configured as a voltage divider or an isolation switch.

Figure 2:
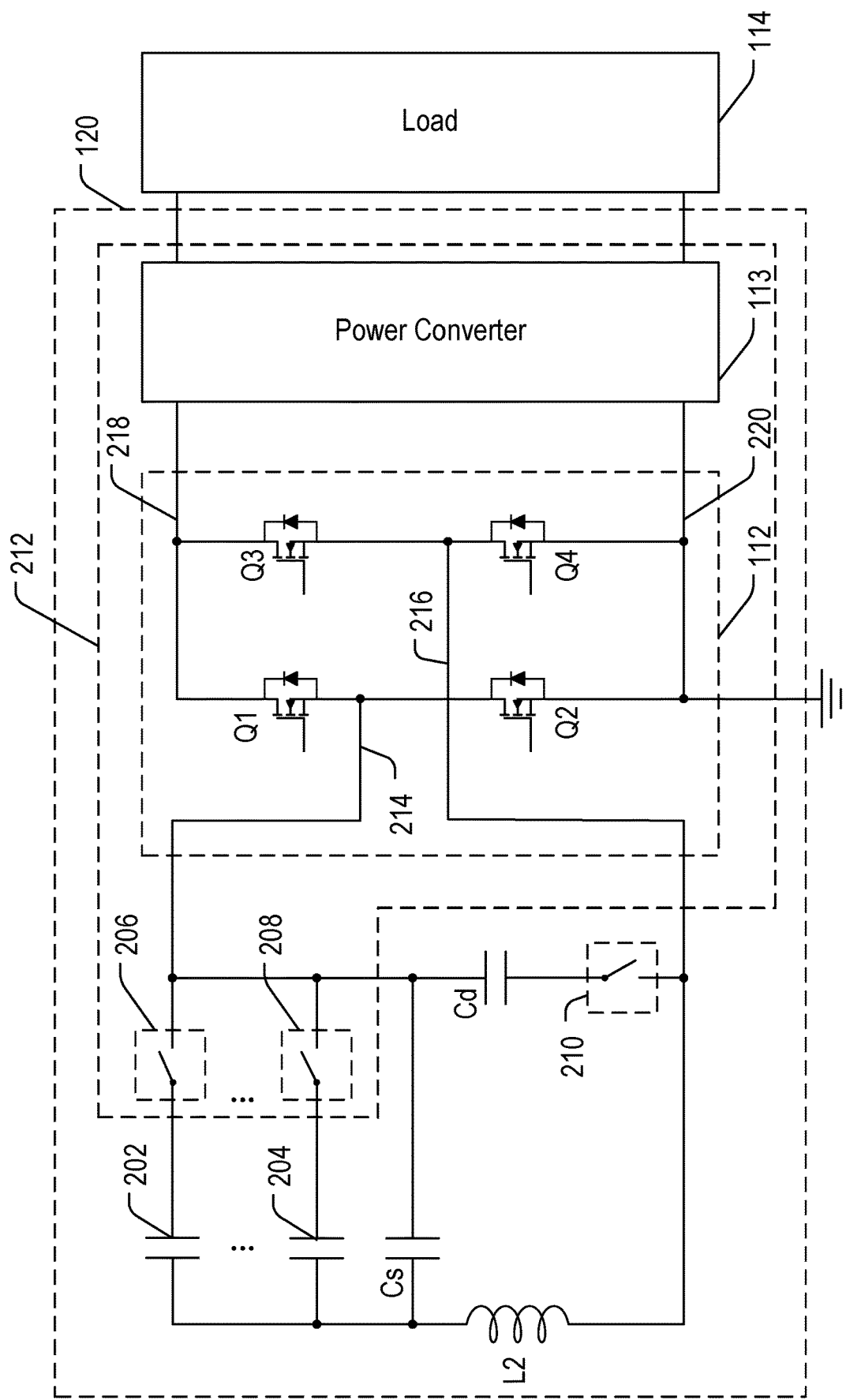
FIG. 2 illustrates a block diagram of the receiver shown in FIG. 1 in accordance with some embodiments.

FIG. 2 illustrates a block diagram of the receiver 120 in accordance with various embodiments of the present disclosure. As shown in FIG. 2, the receiver 120 includes the receiver coil L2, the receiver resonant capacitor Cs, the resonant capacitor Cd, the rectifier 112, and the power converter 113. The rectifier 112 may include two inputs 214 and 216 and two outputs 218 and 220. A series combination of the receiver coil L2 and the receiver resonant capacitor Cs is connected between the input 214 and the input 216 of the rectifier 112. More particularly, the input 214 is connected to the receiver resonant capacitor Cs, and the input 216 is connected to the receiver coil L2. The receiver coil L2 is configured to be magnetically coupled to a transmitter coil (not shown). The receiver resonant capacitor Cs and the receiver coil L2 form a receiver resonant tank. The resonant capacitor Cd is connected between the input 214 and the input 216 of the rectifier 112. Alternatively, the resonant capacitor Cd is connected in series with an optional switch 210, and a series combination of the Cd and the switch 210 is connected between the inputs 214 and 216. The resonant capacitor Cd may be configured to have the receiver 120 operate at a specific resonant frequency so that the power transmitter 110 (as shown in FIG. 1) may detect the presence of the receiver 120. The outputs 218 and 220 of the rectifier 112 are connected to the inputs of the power converter 113. The outputs of the power converter 113 are connected to the load 114.

In some embodiments, the rectifier 112 is implemented as a synchronous rectifier. The rectifier 112 may include four switching elements, namely Q1, Q2, Q3 and Q4. As shown in FIG. 2, the switching elements Q1 and Q2 are connected in series between the outputs 218 and 220 of the rectifier 112. Likewise, the switching elements Q3 and Q4 are connected in series between the outputs 218 and 220. The common node of the switching elements Q1 and Q2 is connected to the input 214, which is coupled to a first terminal of the receiver coil L2 through the resonant capacitor Cs. The common node of the switching elements Q3 and Q4 is connected to the input 216, which is coupled to a second terminal of the receiver coil L2. According to some embodiments, the switching elements of the rectifier 112 are implemented as metal-oxide-semiconductor field-effect transistor (MOSFET) or MOSFETs connected in parallel, any combinations thereof and/or the like. It should be noted that while the example throughout the description is based upon a full-wave rectifier (e.g., rectifier 112 shown in FIG. 2), the implementation of the receiver shown in FIG. 2 may have many variations, alternatives, and modifications. For example, half-wave rectifiers may be alternatively employed. In sum, the rectifier 112 illustrated herein is limited solely for the purpose of clearly illustrating the inventive aspects of the various embodiments. The present disclosure is not limited to any particular power topology.

In some embodiments, the receiver 120 comprises one or more capacitor-switch networks configured for in-band communications. Each of the one or more capacitor-switch networks may be controlled independently. In operation, the receiver is configured to send one or more control signals (communication information) to the transmitter magnetically coupled to the receiver. The one or more control signals are transmitted through suitable modulation schemes such as amplitude shift keying (ASK). The ASK modulation scheme may be implemented by adjusting the impedance coupled to the receiver coil L2. As a result of adjusting the impedance coupled to the receiver coil L2, the gain of the wireless power transfer system varies accordingly. The controller on the transmitter side detects the variation of the gain through analyzing the current flowing through the transmitter coil and/or the voltage across the transmitter coil. The variation of the gain can be demodulated to retrieve the control signals sent from the receiver.

In a conventional power receiver, the capacitor-switch networks for in-band communications may be connected between the input 214 and the input 216 (not shown in FIG. 2). This design may cause an oscillating current to interfere with the functioning of the rectifier. Specifically, when the capacitor-switch networks between the inputs 214 and 216 are turned on, capacitors in the capacitor-switch networks and some other capacitors in the receiver may form a resonant circuit with the receiver coil. An oscillating current between the inputs 214 and 216 may be generated due to the LC tank properties of the resonant circuit. This oscillating current may interfere with currents in the rectifier and cause unexpected consequences to the functioning of the rectifier when the oscillating current is large and the currents within the rectifier are small. For example, the receiver coil may use a smaller induction to reduce the heat generated by the receiver during the power transfer. In the meantime, the capacitor-switch networks may use capacitors with a larger capacitance to generate sufficient impedance variation for the in-band communications or to support a high charging capacity. Thus, the resonant frequency is increased and the oscillating current between the inputs 214 and 216 also is increased. When the receiver is not coupled to any loads or merely coupled to a light load, the currents within the rectifier 112 are small. The oscillating current may become large enough to change the direction of a current within the rectifier. For instance, the current flowing through Q1 from the input 214 to the output 218 may be affected by the oscillating current between the input 214 and the input 216 and may change direction. The reverse current flowing from the output 218 to the input 214 may cause a sudden drop of an output voltage of the rectifier and data loss during the in-band communications in the wireless power transfer system. As a result, the rectifier may shut down and even the wireless power transfer may end unintentionally.

The present disclosure provides techniques that reduce the oscillating current that interferes with the rectifier by avoiding connecting the capacitor-switch networks for in-band communications between inputs of the rectifier. In various embodiments, the capacitor-switch networks for in-band communications may be connected in parallel with the resonant capacitor Cs, rather than being connected between the inputs of the rectifier. As shown in FIG. 2, the capacitor-switch networks for in-band communications of the receiver include a plurality of capacitors 202, . . . , 204 and a plurality of switches 206, . . . , 208. The capacitor-switch networks include at least a first capacitor-switch network including the capacitor 202 connected in series with the switch 206 and a second capacitor-switch network including the capacitor 204 connected in series with the switch 208. Each capacitor-switch network is connected in parallel with the resonant capacitor Cs. The series combination of the capacitor 202 and the switch 206 is connected in parallel with the resonant capacitor Cs, and the series combination of the capacitor 204 and the switch 208 is connected in parallel with the resonant capacitor Cs.

The plurality of capacitors 202, ..., 204 and the plurality of switches 206, ..., 208 may be configured to generate a plurality of impedance variations. The receiver 120 may select two different impedances from the plurality of impedance variations it is configured to generate and switch between these two impedances during the ASK modulation based communication. A half waveform of the voltage between outputs of the rectifier 112 may be referred to as Vrect. The amplitude of the Vrect is affected by an impedance coupled between the first input and the second input of the rectifier 112. Thus, one of the selected two impedances leads to a lower level amplitude of the Vrect, and another leads to a higher level amplitude of the Vrect. In other words, the lower level amplitude of the Vrect is associated with a Low state of the ASK modulation, and the higher level amplitude of the Vrect is associated with a High state of the ASK modulation.

In various embodiments, the receiver 120 may include a controller circuit 212. The controller circuit 212 may be one single chip. The plurality of capacitors 202, ..., 204 may be located outside of the controller circuit 212. The plurality of switches 206, ..., 208 may be located inside of the controller circuit 212 and may be controlled by control signals provided by the controller circuit 212. In some embodiments, the controller circuit 212 may include the rectifier 112 and the power converter 113. Alternatively, in various embodiments, the rectifier 112 and the power converter 113 are located outside the controller circuit 212. The controller circuit 212 may be configured to turn ON or OFF each of the plurality of switches 206, ..., 208 to generate the plurality of impedance variations.

Figure 3:
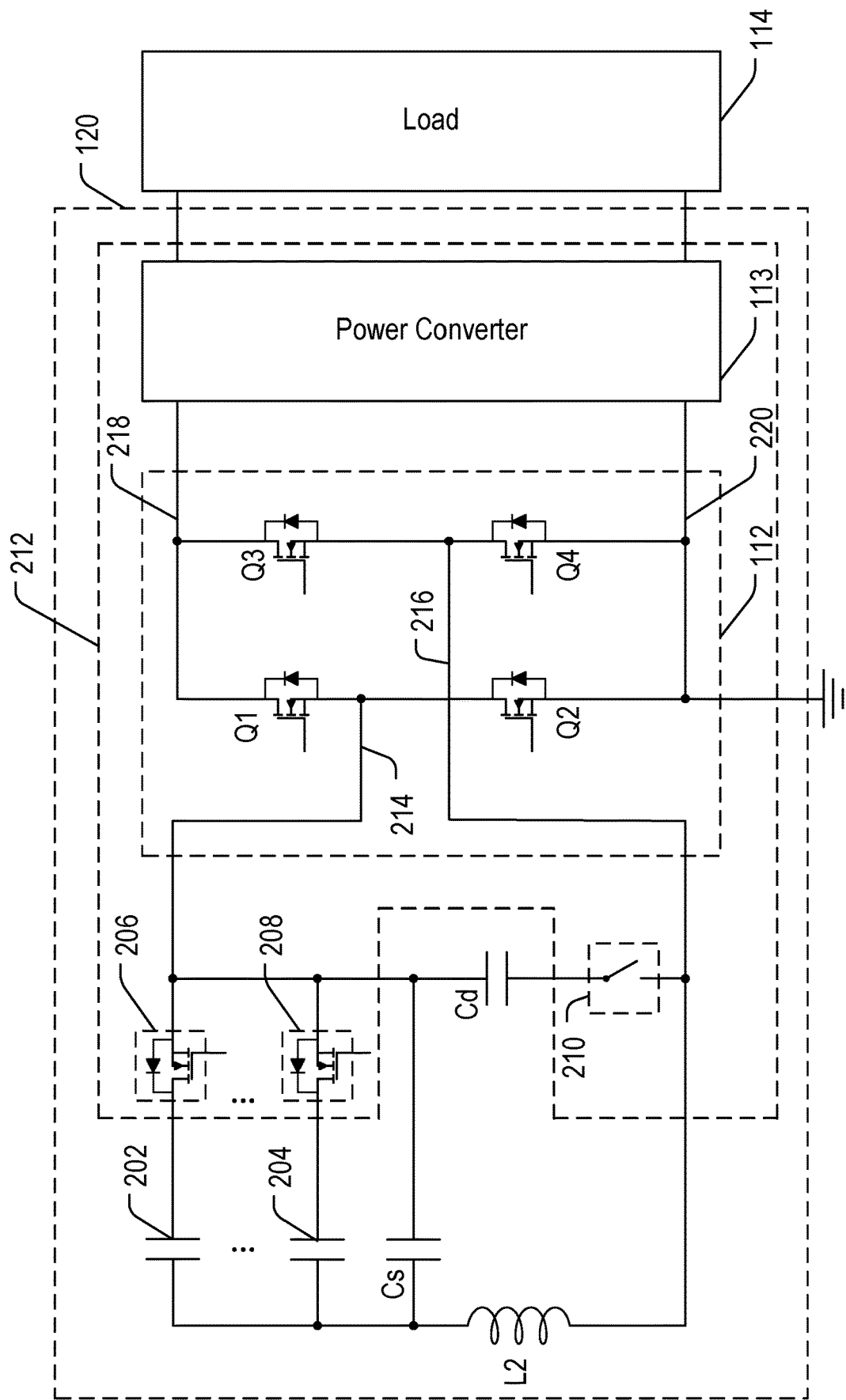
FIG. 3 illustrates a wireless power receiver including switches implemented as field-effect transistors (FETs) in accordance with some embodiments.

In various embodiments, the plurality of switches 206, ..., 208 may be implemented as field-effect transistors (FETs) as shown in FIG. 3. In some embodiments, the gate drive voltages of the FETs 206, ..., 208 may be adjusted so that each FET may function as a switch, or a resistor, or both. In various embodiments, depending on the gate drive voltage, each of the FETs 206, ..., 208 may operate in one of at least three modes: saturation mode where the FET functions as a switch that is turned on with a small on resistance, cut-off mode where the FET functions as a switch that is turned off, and ohmic mode where the FET functions as a resistor whose resistance is controlled by the gate drive voltage. As such, the capacitor-switch networks may become capacitor-resistor networks. The capacitor-resistor networks comprise one or more control variable, namely the resistance of the FETs. The resistance of each FET may be adjustable through adjusting the corresponding gate drive voltage. As a result, the capacitor-resistor networks may be an adjustable impedance network coupled to the receiver coil. The controller circuit 212 is able to generate a plurality of impedance variations by adjusting the capacitor-resistor networks. During the communication process, the receiver 120 or the controller circuit 212 may select two suitable impedances from the plurality of impedance variations and associate the selected impedances with the Low state and the High state of the ASK modulation.

In various embodiments, the receiver 120 or the controller circuit 212 may adjust a corresponding gate drive voltage of at least one of the plurality of FETs 206, ..., 208 to switch configurations of the capacitor-switch networks when a corresponding drain-source voltage of the at least one of the plurality of FETs 206, ..., 208 is close to 0. When the drain-source voltages of the FETs 206, ..., 208 are close to 0, the voltage across the resonant capacitor Cs also is small. Thus, switching configurations of the capacitor-switch networks when the voltage across Cs is low may reduce the impact on the functioning of the rectifier 112.

In one embodiment, the switch 210 connected in series with the resonant capacitor Cd may be located outside of the controller circuit 212. In another embodiment, the switch 210 may be included in the controller circuit 212. The controller circuit 212 may turn off the switch 210 during the in-band communications to further reduce the oscillating current that may interfere with the functioning of the rectifier 112. In various embodiments, the switch 210 may also be implemented as a FET.

Figure 4:
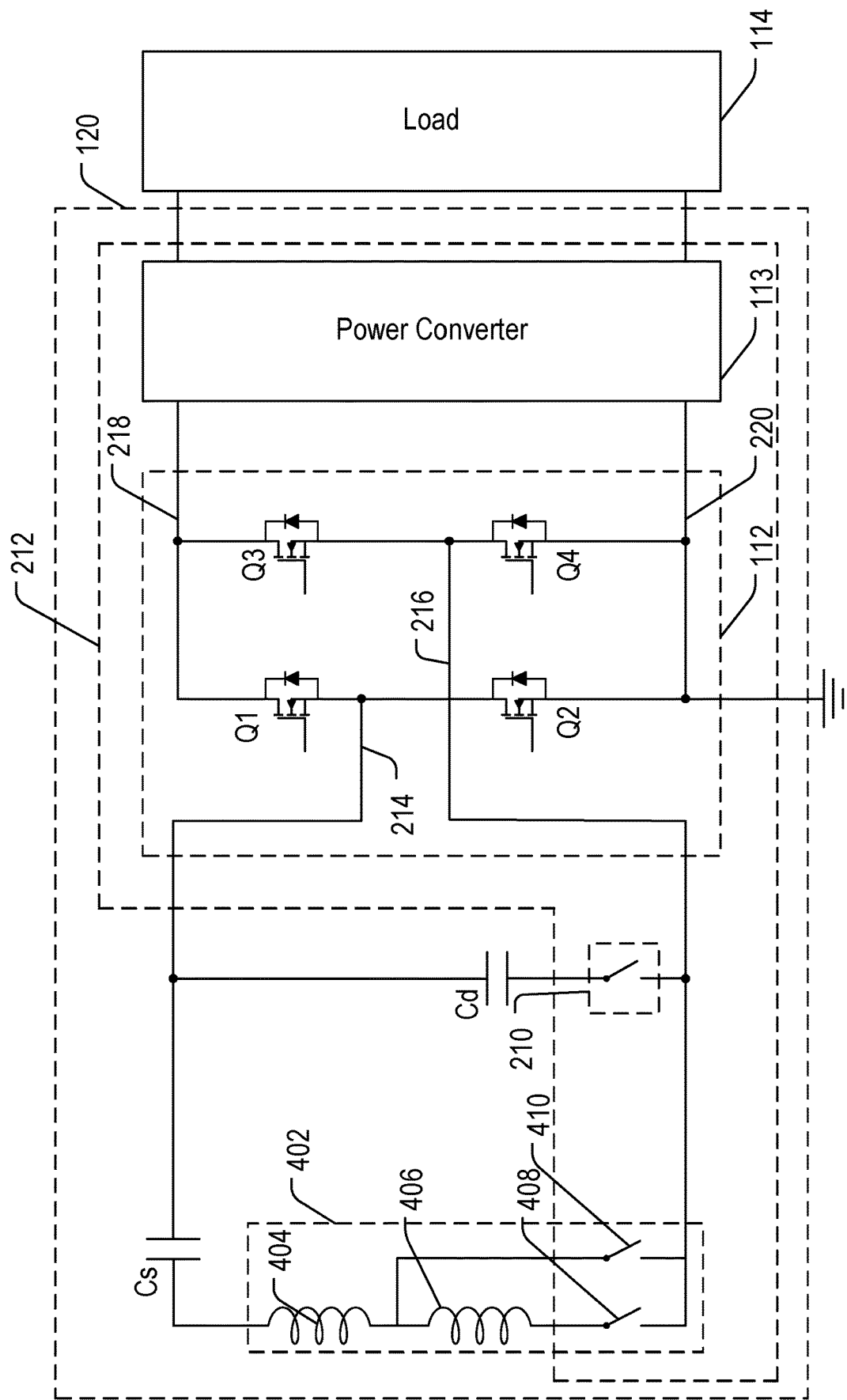
FIG. 4 illustrates a wireless power receiver including a variable inductor in accordance with some embodiments.

The present disclosure further provides other techniques that reduce the oscillating current that interferes with the rectifier. FIG. 4 illustrates a power receiver that includes a variable inductor in accordance with some embodiments. The receiver coil L2 in FIGS. 1-3 may be replaced with a variable inductor 402. Instead of relying on the capacitor-switch networks, an inductance of the variable inductor 402 may be adjusted to provide a plurality of impedance variations for the in-band communications between the transmitter and the receiver. The receiver may configure the variable inductor in different ways and associate two of the configurations with the Low state and the High state of the ASK modulation, respectively.

In one embodiment, the variable inductor 402 may be implemented as an inductor-switch network. As shown in FIG. 4, the variable inductor 402 may include an inductor 404 and an inductor 406 connected by two switches 408 and 410. In a first configuration, the switch 410 is turned off, and the switch 408 is turned on. A first inductance of the variable inductor 402 is provided by the inductor 404 and the inductor 406 connected in series. In a second configuration, the switch 408 is turned off, and the switch 410 is turned on. A second inductance of the variable inductor 402 is provided by the inductor 404. Optionally, the switch 408 may be removed. In this case, one terminal of the inductor 406 is connected to the inductor 404, and the other terminal of the inductor 406 is connected to the input 216 directly. The switch 410 is turned off in the first configuration and is turned on in the second configuration. In the second configuration, the second inductance of the variable inductor is still provided by the inductor 404 because the inductor 406 is short when the switch 410 is turned on. The receiver 120 may apply the first configuration for the Low state of the ASK modulation and apply the second configuration for the High state of the ASK modulation, or vice versa. This embodiment depicted in FIG. 4 is merely illustrative, and thus should not be construed in a limited scope. Any suitable implementations known in the art may be applied to the variable inductor 402.

In various embodiments, the controller circuit 212 may include a circuit that is configured to adjust the variable inductor 402 (such as the switches 408 and 410). The controller circuit 212 may include the rectifier 112 and the power converter 113. Alternatively, the rectifier 112 and the power converter 113 may be located outside the controller circuit 212. The controller circuit 212 may further include the optional switch 210.

Figure 5:
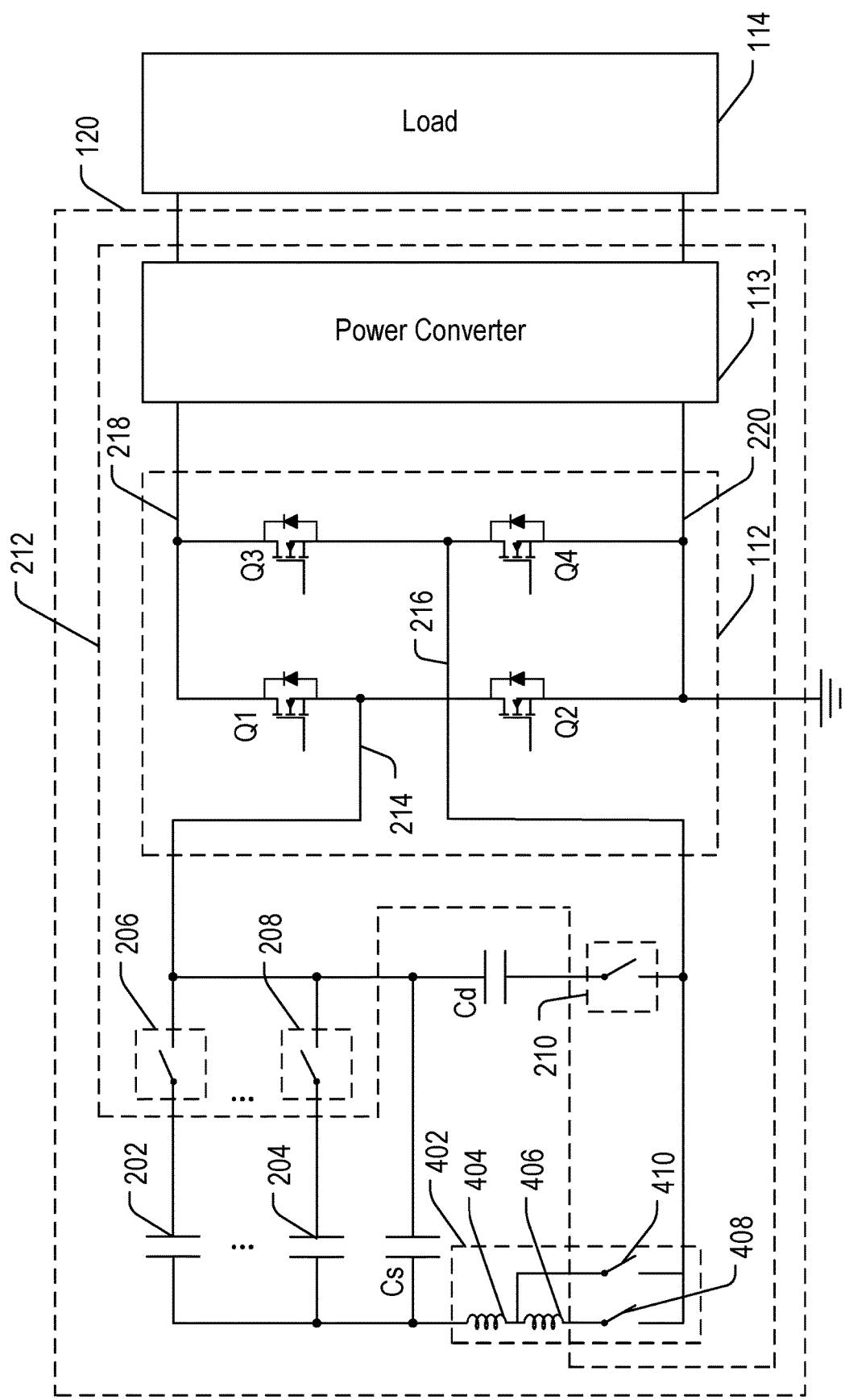
FIG. 5 illustrates a wireless power receiver including both a variable inductor and multiple capacitor-switch networks in accordance with some embodiments.

FIG. 5 illustrates a power receiver that includes both a variable inductor and multiple capacitor-switch networks in accordance with some embodiments. The receiver 120 includes the plurality of capacitor-switch networks connected in parallel with the resonant capacitor Cs. The plurality of capacitor-switch networks includes at least a first capacitor-switch network including the capacitor 202 connected in series with the switch 206 and a second capacitor-switch network including the capacitor 204 connected in series with the switch 208. The receiver 120 further includes the variable inductor 402 connected between the input 216 and the parallel combination of the resonant capacitor Cs and the plurality of capacitor-switch networks.

The plurality of capacitor-switch networks and the variable inductor 402 may be configured to generate a plurality of impedance variations for the in-band communications between the transmitter 110 (not shown in FIG. 5) and the receiver 120. The controller circuit 212 may include a circuit configured to control the capacitors 202, . . . , 204 (such as the switches 206, . . . , 208) and a circuit configured to control the variable inductor 402 (such as the switches 408 and 410). The controller circuit 212 may further include the optional switch 210. In various embodiments, the controller circuit 212 may further include the rectifier 112 and the power converter 113.

The specific embodiments depicted in FIGS. 2-5 are merely illustrative, and thus should not be construed in a limited scope. Any suitable number of capacitors, inductors, or switches may be used in the receiver 120 for in-band communications. For example, the receiver 120 may use merely one capacitor-switch network including a series combination of one capacitor and one switch. In another example, the receiver 120 may use three or more capacitor-switch networks for in-band communications. Furthermore, persons skilled in the art may implement specific devices that utilize any of the embodiments shown in FIGS. 2-5, or combine all or only a subset of these embodiments in one single device.

In various embodiments, the controller circuit 212 may configure the capacitors 202, . . . , 204 or the variable inductor 402 in accordance with local measurements performed in the receiver 120. The local measurements may include measurements of an output voltage of the rectifier, i.e., the Vrect between the outputs 218 and 220. For example, the controller circuit 212 may further include a measurement circuit, a detection circuit, and a driver circuit. The measurement circuit may be coupled to the outputs 218 and 220. The measurement circuit may include at least one analog-to-digital converter (ADC) and is configured to measure the output voltage between the outputs 218 and 220. The detection circuit may be configured to determine the difference between the lower level amplitude and the higher level amplitude of the Vrect and output the determined difference to the driver circuit. The driver circuit may be configured to generate control signals for the capacitors 202, . . . , 204 and/or the variable inductor 402 based on outputs of the detection circuit.

Figure 6:
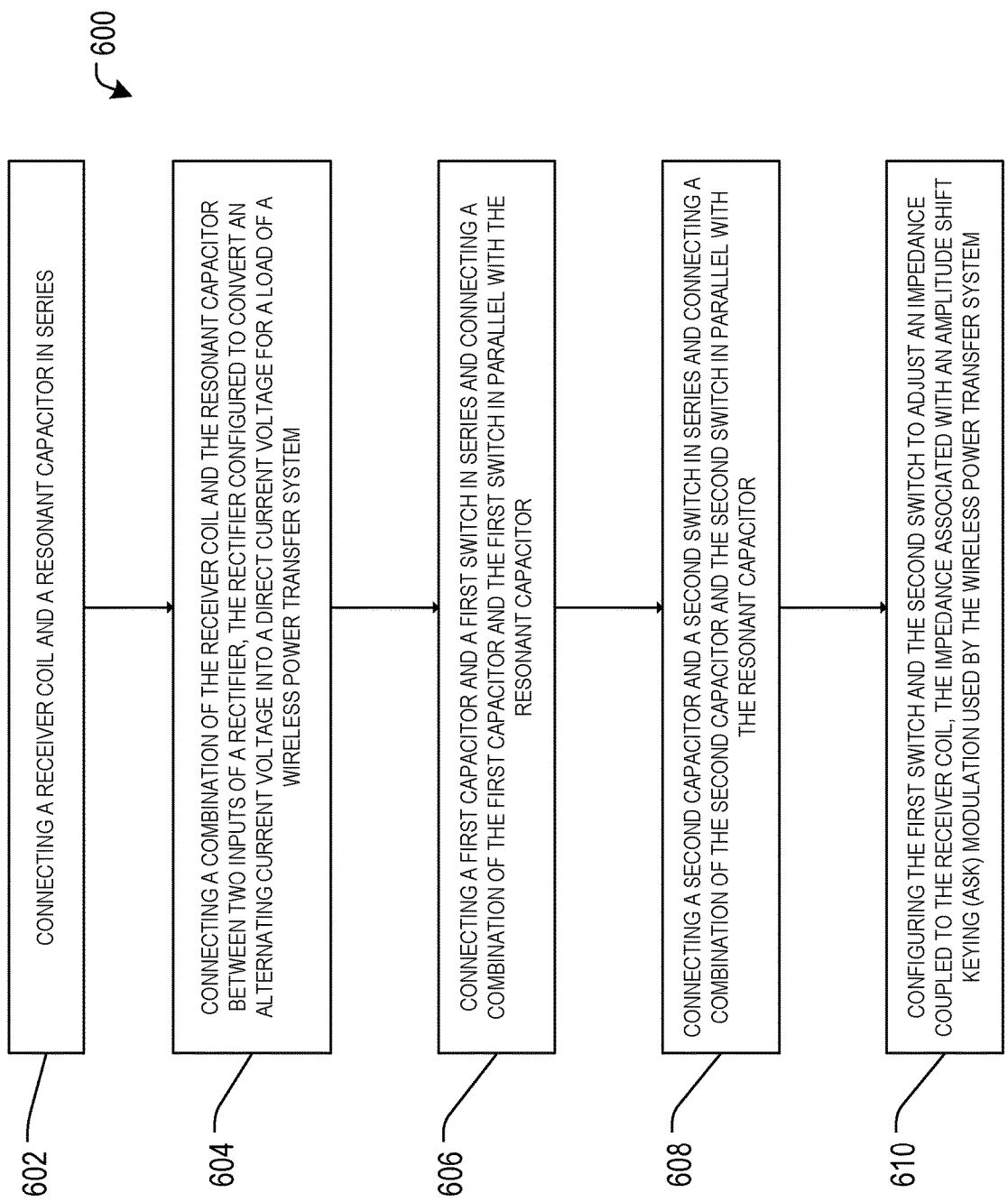
FIG. 6 illustrates a flow chart of controlling in-band communications of a wireless power transfer system in accordance with some embodiments.

FIG. 6 illustrates a flow chart of controlling in-band communications of a wireless power transfer system in accordance with various embodiments of the present disclosure. This flowchart is merely an example, which should not unduly limit the scope of the claims. One of ordinary skill in the art would recognize many variations, alternatives, and modifications. For example, various steps illustrated in FIG. 6 may be added, removed, replaced, rearranged and repeated.

A wireless power transfer system (e.g., wireless power transfer system shown in FIG. 1) comprises a transmitter and a receiver. The transmitter comprises a full bridge, a transmitter resonant capacitor and a transmitter coil. The receiver comprises a receiver coil, a resonant capacitor (such as the receiver resonant capacitor Cs) and a rectifier. The transmitter coil is magnetically coupled to the receiver coil. The wireless power transfer system may further comprise a controller circuit placed in the receiver.

At step 602, a receiver coil and a resonant capacitor are connected in series.

At step 604, a combination of the receiver coil and the resonant capacitor is configured to be connected between two inputs of a rectifier. The rectifier is configured to convert an alternating current voltage into a direct current voltage for a load coupled to a wireless power transfer system.

At step 606, a first capacitor and a first switch are connected in series. A combination of the first capacitor and the first switch is configured to be connected in parallel with the resonant capacitor.

At step 608, a second capacitor and a second switch are connected in series. A combination of the second capacitor and the second switch is configured to be connected in parallel with the resonant capacitor.

At step 610, the first switch and the second switch are configured to adjust an impedance coupled to the receiver coil. The impedance is associated with an Amplitude Shift Keying (ASK) modulation used by the wireless power transfer system.

In various embodiments, the first switch and the second switch are included in a controller circuit. The controller circuit may configure the first switch and the second switch to provide a plurality of impedances coupled to the receiver coil.

Figure 7A:
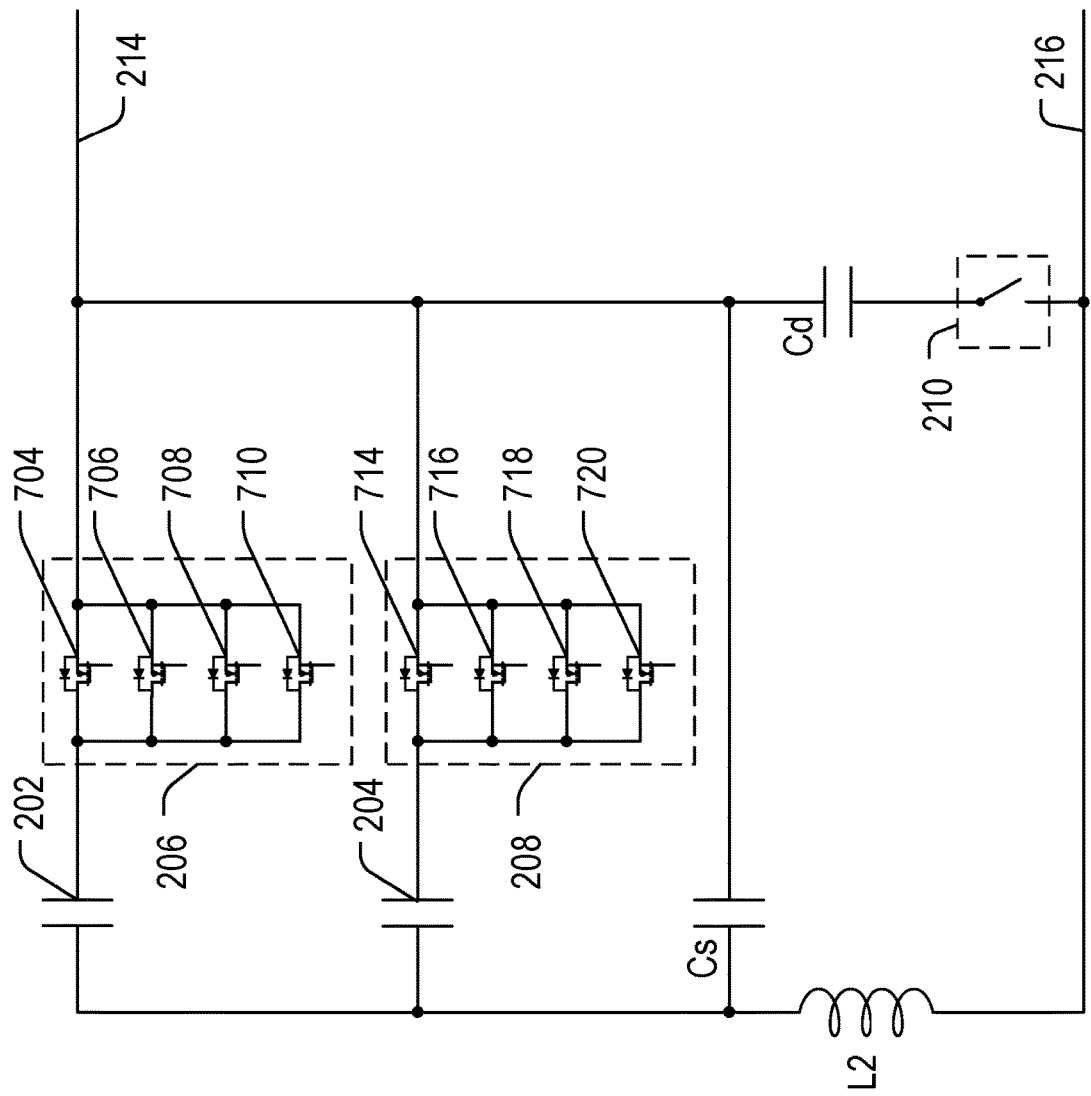
FIGS. 7A-7C illustrates examples of capacitor-switch networks for the in-band communications in accordance with some embodiments.
Figure 7B:
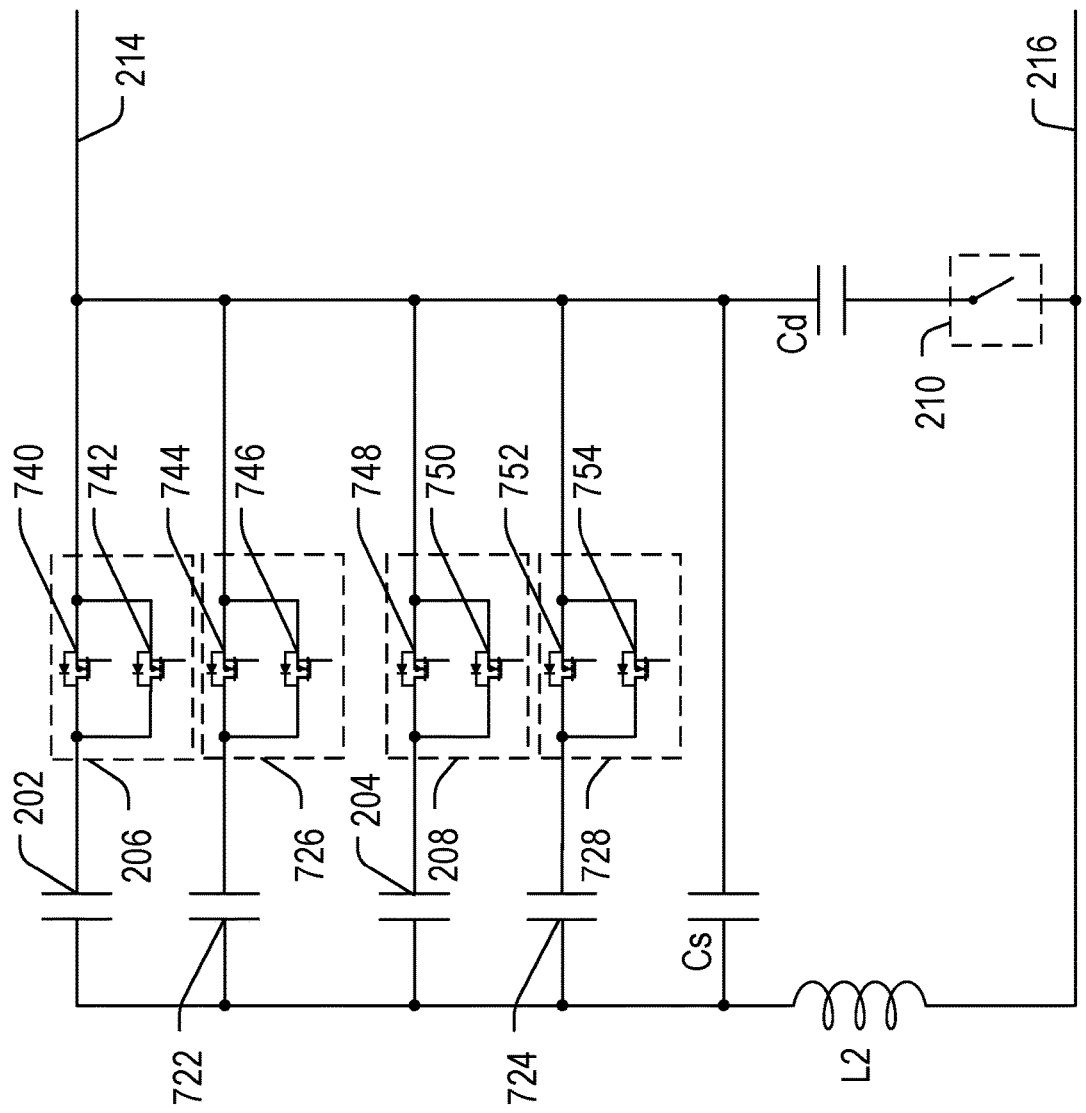
Figure 7C:
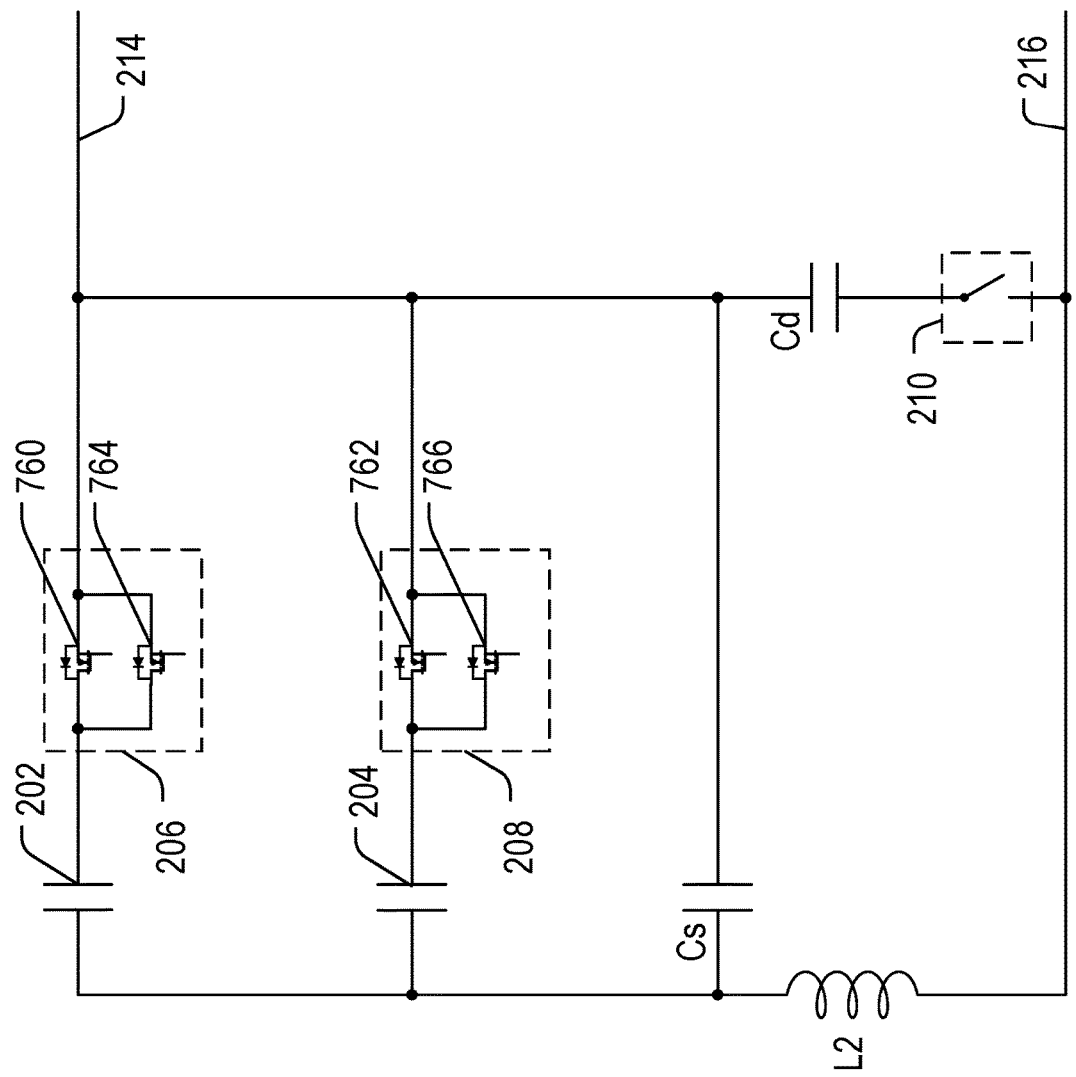

In various embodiments, each of the plurality of switches 206, . . . , 208 in the capacitor-switch networks for in-band communications described herein may be a FET network implemented using multiple FETs. FIGS. 7A-7C illustrate various examples of the capacitor-switch networks in the receiver.

In one example depicted in FIG. 7A, the capacitor-switch networks include a first capacitor-switch network (including the capacitor 202 and the switch 206 connected in series) and a second capacitor-switch network (including the capacitor 204 and the switch 208 connected in series). Both the first capacitor-switch network and the second capacitor-switch network are connected in parallel with the resonant capacitor Cs. The switch 206 is a FET network that includes four FETs 704, 706, 708, and 710 connected in parallel. The switch 208 is another FET network that includes four FETs 714, 716, 718, and 720 connected in parallel. A plurality of impedance variations may be generated by switching on or off one or more of the FETs in the switches 206 and 208. A first impedance may be generated when all of the FETs 704, 706, 708, 710, 714, 716, 718, and 720 are switched on. A second impedance may be generated when the FETs 704 and 714 are switched off and the FETs 706, 708, 710, 716, 718, and 720 are switched on. A third impedance may be generated when the FETs 704, 706, 714, and 716 are switched off and the FETs 708, 710, 718, and 720 are switched on. A fourth impedance may be generated when the FETs 704, 706, 708, 714, 716, and 718 are switched off and the FETs 710 and 720 are switched on. A fifth impedance may be generated when the FETs 704, 708, 714, and 718 are switched off and the FETs 706, 710, 716, and 720 are switched on. Similarly, some other different impedances may be generated when different FETs in the switches 206 and 208 are switched off and the other FETs in the switches 206 and 208 are switched on. In various embodiments, the FETs 704, 706, 708, 710, 714, 716, 718, and 720 may be located in the controller circuit 212.

FIG. 7B illustrates another example, where the capacitor-switch networks include a first capacitor-switch network (including the capacitor 202 and the switch 206 connected in series), a second capacitor-switch network (including a capacitor 722 and a switch 726 connected in series), a third capacitor-switch network (including the capacitor 204 and the switch 208 connected in series), and a fourth capacitor-switch network (including a capacitor 724 and a switch 728 connected in series). The first capacitor-switch network, the second capacitor-switch network, the third capacitor-switch network, and the fourth capacitor-switch network are connected in parallel with the resonant capacitor Cs. The switch 206 includes two FETs 740 and 742 connected in parallel. The switch 208 includes two FETs 748 and 750 connected in parallel. The switch 726 includes two FETs 744 and 746 connected in parallel. The switch 728 includes two FETs 752 and 754 connected in parallel. A plurality of impedance variations may be generated by switching on or off one or more of the FETs in the switches 206, 726, 208, and 728. A first impedance may be generated when all of the FETs 740, 742, 744, 746, 748, 750, 752, and 754 are switched on. A second impedance may be generated when the FETs 740 and 748 are switched off and the FETs 742, 744, 746, 750, 752, and 754 are switched on. A third impedance may be generated when the FETs 740, 742, 748, and 750 are switched off and the FETs 744, 746, 752, and 754 are switched on. A fourth impedance may be generated when the FETs 740, 742, 744, 748, 750, and 752 are switched off and the FETs 746 and 754 are switched on. A fifth impedance may be generated when the FETs 740, 748, 744, and 752 are switched off and the FETs 742, 750, 746, and 754 are switched on. Similarly, some other different impedances may be generated when different FETs in the switches 206, 726, 208, and 728 are switched off and the other FETs in the switches 206, 726, 208, and 728 are switched on. In various embodiments, the FETs 740, 742, 744, 746, 748, 750, 752, and 754 may be located in the controller circuit 212.

In yet another example illustrated in FIG. 7C, the capacitor-switch networks include a first capacitor-switch network (including the capacitor 202 and the switch 206 connected in series) and a second capacitor-switch network (including the capacitor 204 and the switch 208 connected in series). The switch 206 includes a FET 760 and a FET 764 connected in parallel. The switch 208 includes a FET 762 and a FET 766 connected in parallel. Each of the FETs 760, 762, 764, and 766 may function as a switch, or a resistor, or both depending on its gate drive voltage. In one example, the FET 760 and the FET 762 may function as switches, and the FET 764 and the FET 766 may operate in ohmic mode. Thus, a plurality of impedance variations may be generated by turning on or off one or more of the FETs 760 and 762 and providing various gate drive voltages to the FET 764 and the FET 766, respectively. In another example, the FETs 760, 762, 764, and 766 may all operate in ohmic mode. A plurality of impedance variations may be generated by providing various configurations of gate drive voltages to these FETs. In various embodiments, the FETs 760, 762, 764, and 766 may be located in the controller circuit 212.

The rectifier 112, the power converter 113 and the load 114 are omitted in FIGS. 7A-7C. The specific embodiments depicted in FIGS. 7A-7C are merely illustrative, and thus should not be construed in a limited scope. These embodiments in FIGS. 7A-7C may be applied to the receiver 120 illustrated in FIGS. 2-5. Any suitable number of capacitors and FETs may be used in the capacitor-switch networks for the in-band communications. Furthermore, persons skilled in the art may implement specific devices that utilize any of the embodiments shown in FIGS. 7A-7C, or combine all or only a subset of these embodiments in one single device.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus for wireless power reception comprising:
   a rectifier configured to convert an alternating current voltage into a direct current voltage for a load coupled to the apparatus;
   a receiver coil and a resonant capacitor connected in series between two inputs of the rectifier;
   a first capacitor and a first switch connected in series to form a first capacitor-switch network connected in parallel with the resonant capacitor, wherein the first switch is configured to function as a resistor, and a resistance value of the resistor is adjustable by controlling a gate drive voltage applied to the first switch; and
   a second capacitor and a second switch connected in series to form a second capacitor-switch network connected in parallel with the resonant capacitor, the first switch and the second switch configured to provide a plurality of impedances coupled to the receiver coil, wherein the plurality of impedances includes at least a first impedance associated with a High state of an Amplitude Shift Keying (ASK) modulation used by the apparatus, and a second impedance associated with a Low state of the ASK modulation.

2. The apparatus of claim 1, wherein the first switch and the second switch are configured to provide the plurality of impedances coupled to the receiver coil using different ON and OFF combinations.

3. The apparatus of claim 1, wherein:
   the first switch is a first field-effect transistor (FET);
   the second switch is a second FET; and
   the first FET and the second FET are configured to provide the plurality of impedances coupled to the receiver coil using different configurations.

4. The apparatus of claim 3, wherein each of the first FET and the second FET is configured to switch configuration when a drain-source voltage of the each of the first FET and the second FET is close to 0.

5. The apparatus of claim 1, further comprising a third capacitor and a third switch connected in series to form a third capacitor-switch network connected in parallel with the resonant capacitor.

6. The apparatus of claim 1, wherein the first switch and the second switch are configured to provide the plurality of impedances coupled to the receiver coil in accordance with measurements of an output voltage of the rectifier.

7. The apparatus of claim 1, wherein the receiver coil is a variable inductor, and wherein the plurality of impedances associated with the ASK modulation is further adjusted by changing an inductance of the receiver coil.

8. The apparatus of claim 1, wherein the apparatus is included in a wireless power transfer system, and wherein the wireless power transfer system further includes a transmitter, a transmitter coil of the transmitter magnetically coupled to the receiver coil.

9. A method comprising:
connecting a receiver coil and a resonant capacitor in series between two inputs of a rectifier, the rectifier configured to convert an alternating current voltage into a direct current voltage for a load of a wireless power transfer system;
connecting a first capacitor and a first switch in series to form a first capacitor-switch network and connecting the first capacitor-switch network in parallel with the resonant capacitor, wherein the first switch is configured to function as a resistor, and a resistance value of the resistor is adjustable by controlling a gate drive voltage applied to the first switch;
connecting a second capacitor and a second switch in series to form a second capacitor-switch network and connecting the second capacitor-switch network in parallel with the resonant capacitor; and
configuring the first switch and the second switch to provide a plurality of impedances coupled to the receiver coil, wherein the plurality of impedances includes at least a first impedance associated with a High state of an Amplitude Shift Keying (ASK) modulation used by the wireless power transfer system, and a second impedance associated with a Low state of the ASK modulation.

10. The method of claim 9, wherein the first switch and the second switch are configured to provide the plurality of impedances coupled to the receiver coil using different ON and OFF combinations.

11. The method of claim 9, wherein:
the first switch is a first field-effect transistor (FET);
the second switch is a second FET; and
the first FET and the second FET are configured to provide the plurality of impedances coupled to the receiver coil using different configurations.

12. The method of claim 11, wherein each of the first FET and the second FET is configured to switch configuration when a drain-source voltage of the each of the first FET and the second FET is close to 0.

13. The method of claim 9, further comprising:
connecting a third capacitor and a third switch in series to form a third capacitor-switch network; and
connecting the third capacitor-switch network in parallel with the resonant capacitor.

14. The method of claim 9, wherein the first switch and the second switch are configured to provide the plurality of impedances coupled to the receiver coil in accordance with measurements of an output voltage of the rectifier.

15. A controller circuit of a wireless power reception system comprising:
a first switch and a second switch, the first switch connected in series with a first capacitor to form a first capacitor-switch network, the second switch connected in series with a second capacitor to form a second capacitor-switch network, wherein the first switch is configured to function as a resistor, and a resistance value of the resistor is adjustable by controlling a gate drive voltage applied to the first switch, and wherein:
the first capacitor-switch network is connected in parallel with a resonant capacitor, a series combination of the resonant capacitor and a receiver coil of the wireless power reception system connected between two inputs of a rectifier of the wireless power reception system, wherein the receiver coil is a variable inductor formed by a first inductor, a second inductor, a first auxiliary switch and a second auxiliary switch, and wherein the first inductor, the second inductor and the first switch are connected in series between a common node of the first capacitor and the resonant capacitor, and an input of the rectifier, and the second auxiliary switch is connected between a common node of the first inductor and the second inductor, and the input of the rectifier;
the second capacitor-switch network is connected in parallel with the resonant capacitor; and
the first switch and the second switch are configured to provide a plurality of impedances coupled to the receiver coil, wherein the plurality of impedances includes at least a first impedance associated with a High state of an Amplitude Shift Keying (ASK) modulation used by the wireless power reception system, and a second impedance associated with a Low state of the ASK modulation.

16. The controller circuit of claim 15, wherein the rectifier is configured to convert an alternating current voltage into a direct current voltage for a load coupled to the wireless power reception system.

17. The controller circuit of claim 15, wherein the first switch and the second switch are configured to provide the plurality of impedances coupled to the receiver coil using different ON and OFF combinations.

18. The controller circuit of claim 17, wherein:
the first switch comprises a first field-effect transistor (FET) and a second FET connected in parallel;
the second switch comprises a third FET and a fourth FET connected in parallel;
the first FET, the second FET, the third FET and the fourth FET are configured to provide the plurality of impedances coupled to the receiver coil using different configurations, and wherein the first FET and the third FET are configured to function as switches, and the second FET and the fourth FET are configured to function as resistors, and wherein resistance values of the resistors are controlled by gate drive voltages applied to the second FET and the fourth FET.

19. The controller circuit of claim 18, wherein each of the first FET and the second FET is configured to switch configuration when a drain-source voltage of the each of the first FET and the second FET is close to 0.

20. The controller circuit of claim 15, wherein the first switch and the second switch are configured to provide the plurality of impedances coupled to the receiver coil in accordance with measurements of an output voltage of the rectifier.

* * * * *